Dec. 16, 1930. J. V. ZENTHOEFER 1,785,237
FILTER CAKE DISCHARGER
Filed Feb. 15, 1927    5 Sheets-Sheet 4

INVENTOR
JOSEPH V. ZENTHOEFER
BY
ATTORNEYS

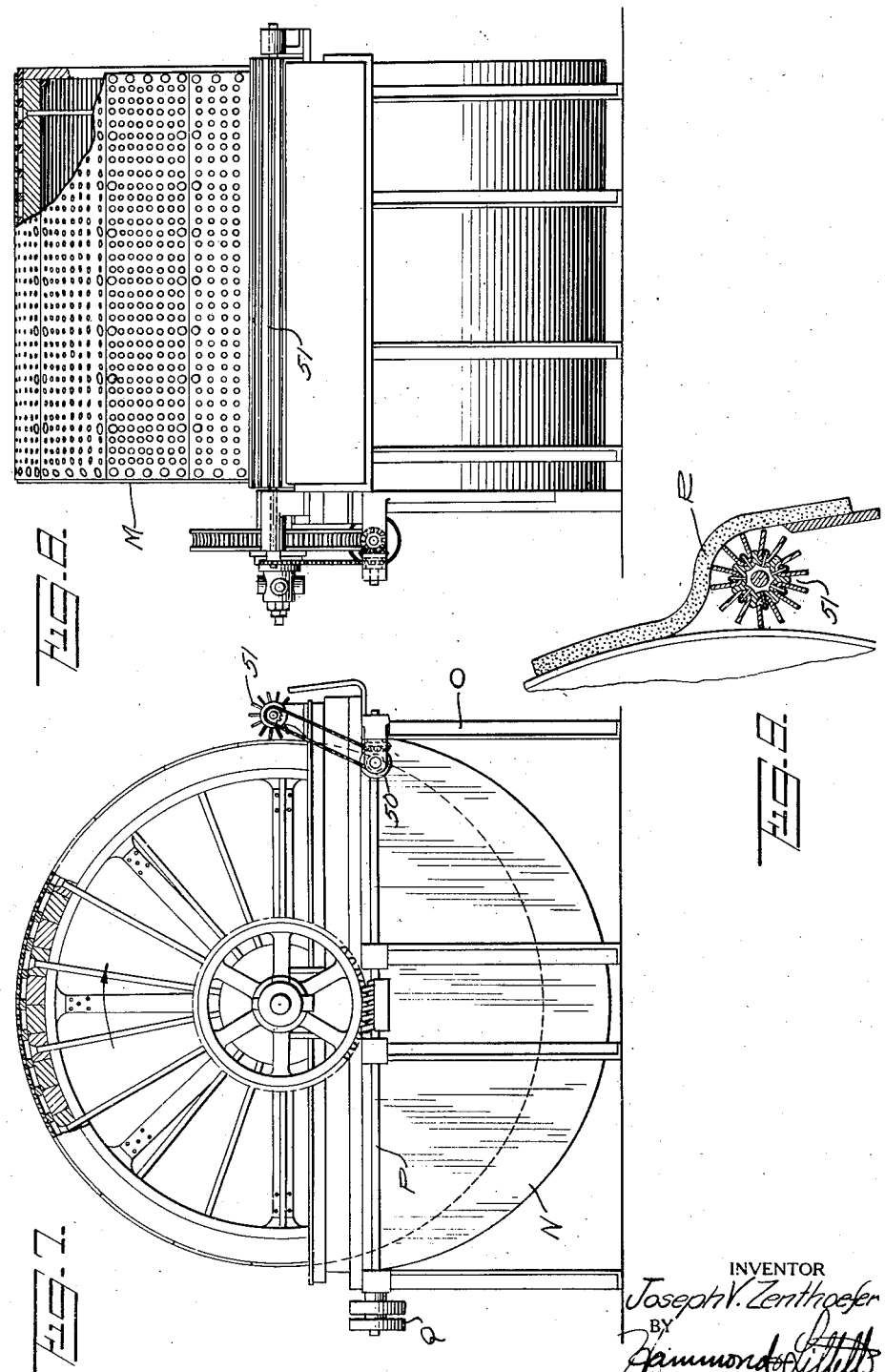

Patented Dec. 16, 1930

1,785,237

UNITED STATES PATENT OFFICE

JOSEPH V. ZENTHOEFER, OF HAZLETON, PENNSYLVANIA, ASSIGNOR, BY MESNE ASSIGNMENTS, TO OLIVER UNITED FILTERS INC., OF SAN FRANCISCO, CALIFORNIA, A CORPORATION OF NEVADA

FILTER-CAKE DISCHARGER

Application filed February 15, 1927. Serial No. 168,274.

This invention relates in general to filters of the continuous type and while I have illustrated my invention applied to continuous filters of both the disk and drum type, it is obviously equally applicable to any filter having a screen of either cloth or woven or perforated metal upon which the filter cake is deposited during one portion of its revolution and removed during another portion.

It is the object of this invention to provide a discharger or means for removing the filter cake from the screen upon which it has been deposited, which will be more efficient in operation, more easily renewed or replaced, more durable, and which will cause less wear on the filter screen.

A further object of this invention is to provide a drive and mounting for the discharger which is easily adjustable and is of a floating nature, thus permitting quick and accurate adjustment of the discharger and allowing the discharger to follow any irregularities or misalignment in the filter disks.

In the apparatus heretofore used for discharging the cake from the filter screen, it has been found difficult to maintain a continuous even contact between the discharging device and the revolving screen. Revolving brushes were tried but while a decided improvement over previous methods still they left much to be desired. When stiff enough bristles were used, to remain radial after becoming wet and soft, the wear on the filter screen was increased. The bristles could not be replaced in the field and in consequence the brushes had to be returned to the factory for rebristling.

A very important feature of my present invention is the replacing of the bristles on the brush discharger by a series of readily detachable radial wiping members. Rubber has been found an excellent material for these members but there are many other materials which could be used with very good results.

It has been found that a discharger of this construction, causes very little wear on the filter, and is easily maintained in alignment and adjustment. It has also been found that the filter cake does not cling to this type of discharger, as is the tendency with brush dischargers, but readily and cleanly separates therefrom. Further, this type of wiping discharger effectually cleans the filter screen, thus preventing clogging which, especially in the paper pulp industry, has been a great drawback of the continuous filter.

Referring now to the drawings which illustrate preferred embodiments of my invention, Figure 1 is an end view of a continuous filter of the American or disk type equipped with my invention. Parts are broken away to more clearly illustrate structural details.

Figure 6 is a detail of my flexible drive for the dischargers.

Figure 7 is an end view of a continuous filter of the drum type equipped with my invention. Parts are broken away to more clearly illustrate structural details.

Figure 8 is a side view of the filter shown in Figure 7 and showing the general arrangement of parts.

Figure 9 is an enlarged detail view showing my improved discharger in cross section and with the filter cake partially removed from the drum.

This invention is particularly concerned with devices for removing the filter cake from the screens of the filter leaves or disks or from the covered surface of drums of the continuous filter type, and only so much of the general construction of the filter will be described as is necessary for an understanding of the invention.

As is common in continuous filters of the disk type, the leaves or disks A are mounted in spaced relation on a common shaft. This shaft is supported in a horizontal position in suitable bearings in the machine frame and is provided at one end with a worm gear B with which cooperates a driving worm C. The worm C is driven from any convenient source of power, such as the motor D, through reduction device D', shafts E and F and gears G, as is clearly shown in Figure 1.

Figure 1:
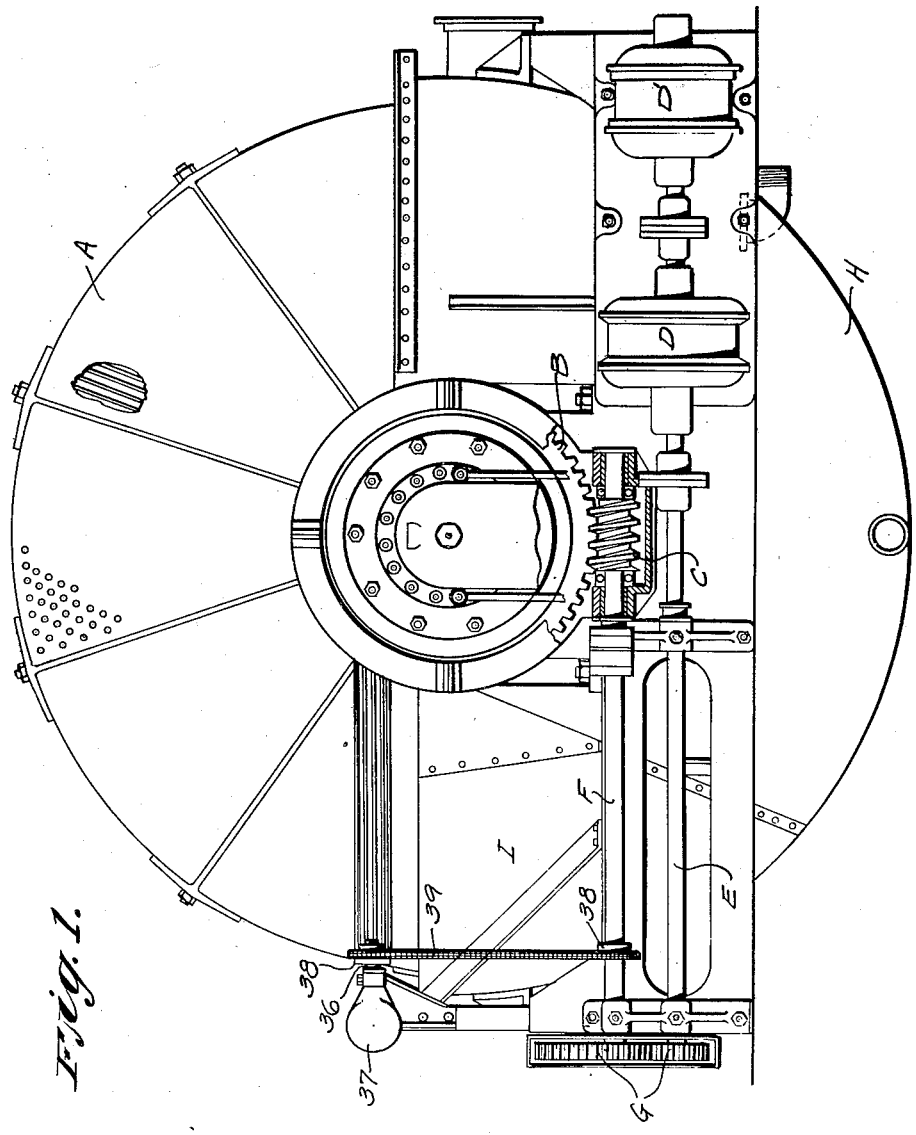
Figure 2:
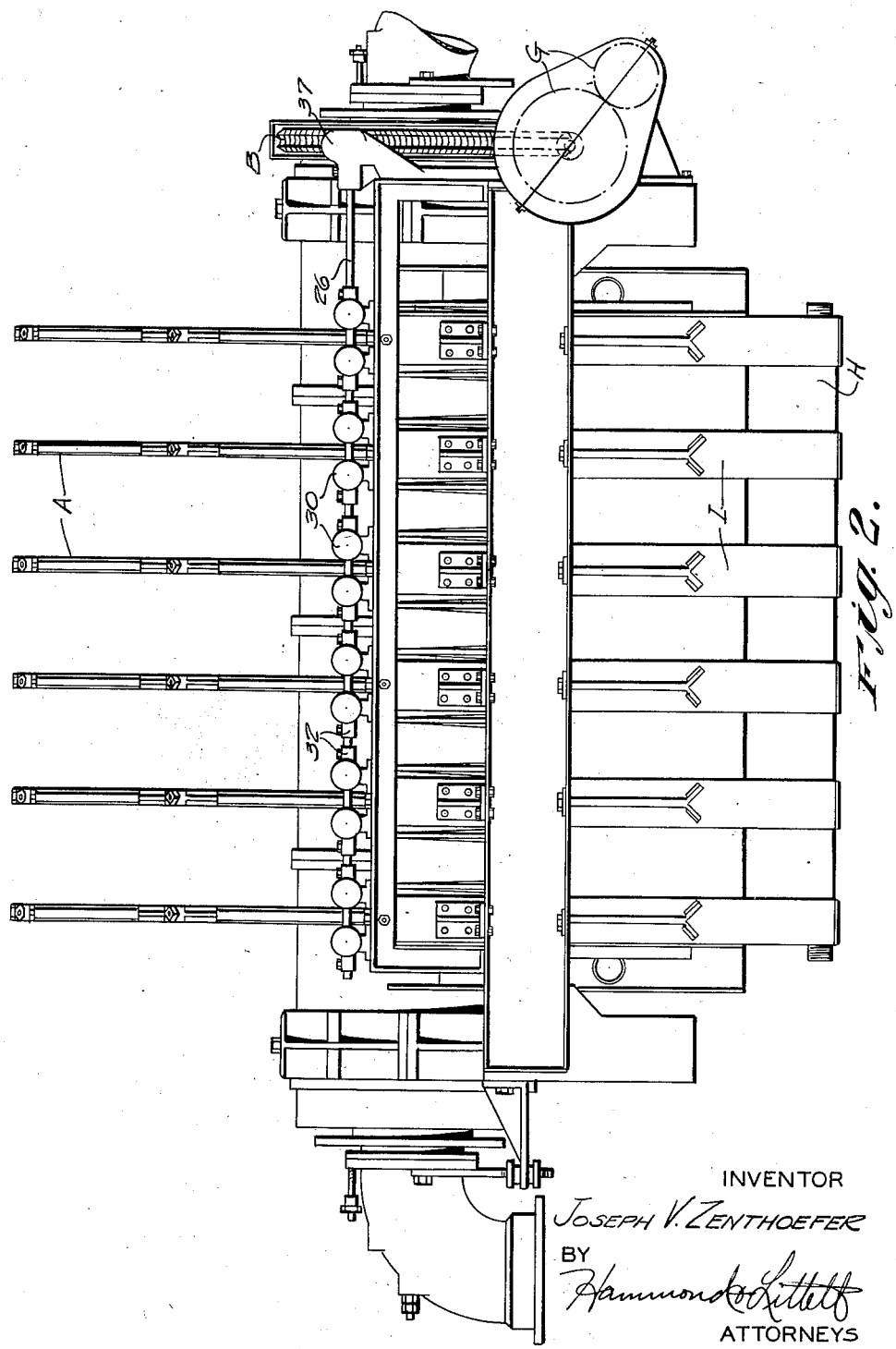
Figure 2 is a side view showing the general arrangement of the filter parts of Fig. 1 and the drive for the dischargers.

A filter tank H having forwardly extending troughs I, one for each filter disk, is mounted on the machine frame in such a manner as to encase substantially the lower half of the disks A, Figures 1 and 2.

The filter disks are shown as covered with perforated metal but woven metal or cloth may be used if preferred.

The operation of filters of this type is, in general, as follows:—As the filter disks A rotate through the mixture in the tank H, a filter cake is accumulated on their surfaces by suction applied to their interior. This cake is carried up out of the mixture and remains on the filter disks until removed by discharging devices just prior to reimmersion.

Having described the filter in general, I will now specifically describe my improved discharging device and the drive therefor.

Figure 3:
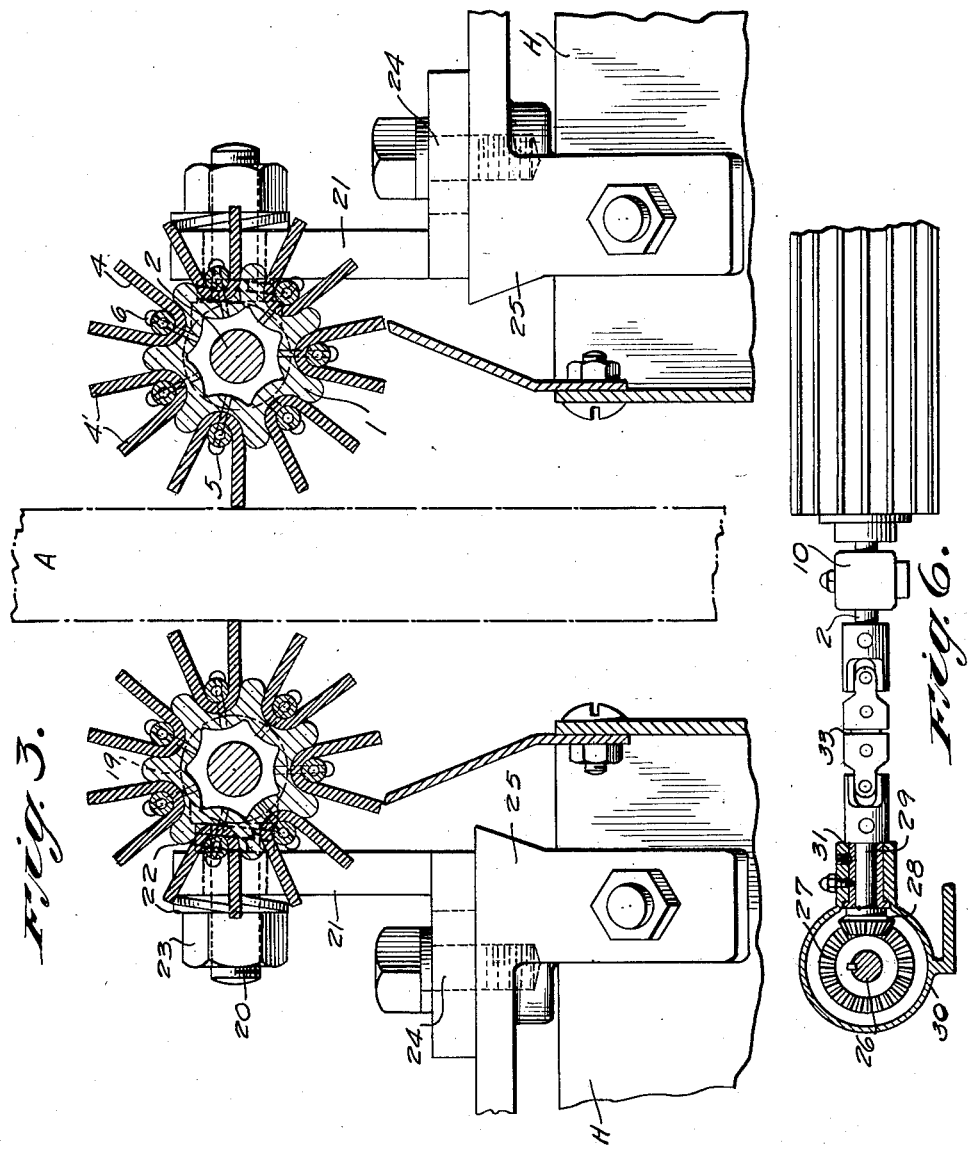
Figure 3 is an enlarged detail showing my improved discharger in cross section, and also the adjustable and yielding mounting of the rear discharger bearing.

My discharger is of the rotating type and is an improvement over the brush dischargers now in use. In my device, I have done away with the bristles and have provided wiping members in their place, as shown in Figure 3. The discharger comprises a body portion 1 fixed to a shaft 2. The interior of the body may, if desired, be hollowed out. The exterior of the body portion is provided with longitudinally extending grooves 3 at regular intervals throughout its periphery, and presents much the appearance of a fluted roller. In each groove is mounted a U shaped wiping member 4 with the legs 4' of the U extending outwardly. These wiping members are locked in the grooves, as shown in Figure 3, by respective cylindrical members 5, held in place by any suitable means, as by screws 6. The tongues between the grooves in the body member are rounded off to prevent wear on the wiping members. In the present instance I employ rubber wiping members, but it is evident that other materials might be used. It is also apparent that other means might be employed for attaching the wipers to the body, but the above described method permits the removal of a wiper by simply removing its locking member 5, thus permitting rapid replacements without the necessity of even removing the discharger from the machine.

The dischargers are mounted sufficiently close to the filter disks A, so that the wiping members will strike the disks a slight blow as they contact therewith and are rotated in a reverse direction thereto, thus stripping the filter cake therefrom.

The striking of the wipers against the filter disks sets up a vibration which causes the cake to freely leave the filter disk and prevents clogging of the filter.

The dischargers are adjustable to and from the filter disks A to compensate for wear or to increase or decrease the wiping contact. The forward ends of the dischargers cooperating with a given disk are mounted in adjustable spaced relation to each other, and are also mounted to float in a lateral direction in unison, thus permitting them to follow the filter disk even though it may be misaligned or warped.

The description of the mounting of one such pair of dischargers will suffice for all pairs. An upwardly projecting arm 7 one for each discharger, is pivotally mounted at its lower end by a stud 8 to the machine frame in such a manner as to swing freely in a plane at right angles to the filter disk A. The upper end of each arm 7 is provided with a turned over foot 9 to which the front bearing 10 of the respective discharger is detachably secured by stud and nut connection.

Figures 4, 5:
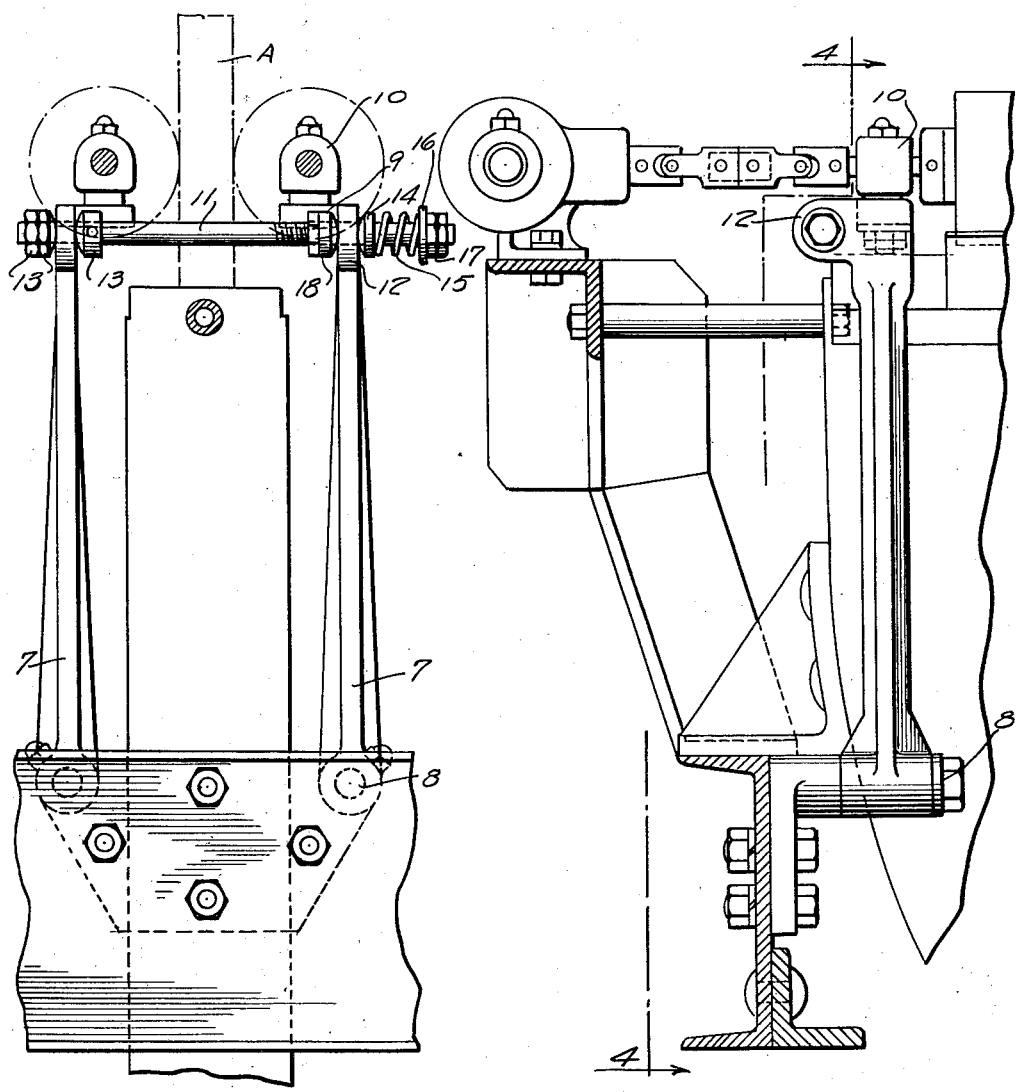
Figure 4 is an enlarged detail of the floating adjustable front discharger bearing support taken approximately on the line 4—4 of Fig. 5.
Figure 5 is a detail of the support for the front discharger bearing showing a side view thereof.

The front bearings of the pair of dischargers cooperating with the same filter disk are maintained in adjustable spaced relation by a rod 11 connecting the upper ends of their supporting arms. This rod passes loosely through apertures in forward extensions 12 on the upper portions of the arms and is secured to one of the arms 7 against longitudinal displacement by round faced nuts or collars 13, on said rod 11 at each side of the arm, as shown in Figure 4. The rod 11 is adjustably secured to the other arm of the pair as follows:—The rod 11 extends some distance through the aperture in this arm. On this extending portion is mounted a collar 14, having its face adjacent the arm rounded off. This collar is held against the arm 7 by a helical spring 15 surrounding the rod and bearing at one end against the collar 14, and at the other against a washer 16, held in position on the rod by a nut 17.

On the inner side of this arm 7, a round faced adjusting nut 18 is threaded on the rod 11. The spring 15, acting through the collar 14, maintains the arm 7 in contact with the rounded face of the adjusting nut 18. It is thus apparent that the adjustment of the distance between the arms 7, and, therefore, between the front discharger bearings 10, is accomplished by simply adjusting the nut 18.

The rounding of the faces of the nuts 13 and 18 and the collar 14, together with the slight play of the rod 11 in the apertures in the projections 12 of the arms 7, permits said arms to swing laterally in fixed relation to one another on their pivot studs 8, thus permitting the dischargers to follow the filter disk even when the latter is out of alignment or is warped.

The lateral swinging of the front bearings 10 will necessitate a slight movement of the rear discharger bearings 19. To provide for this I have mounted the said rear bearing, as shown in Figure 3. The bearing is provided with a stud 20, which passes loosely through an aperture in the upper arm of a bracket 21, which is supported in a manner presently to be described. A spring lock washer 22 is placed on the stud 20 on each side of aforementioned bracket arm, and the assembly is secured together by a nut 23 on the stud. This nut is tightened only sufficiently to slightly compress the spring lock washers, thus permitting a slight amount of spring restrained freedom between the rear bearing and its support. This freedom, while slight, is sufficient to accommodate the displacements caused by the floating action of the front bearing.

The rear bearing supporting bracket 21 is adjustably mounted by a slot and stud connection 24, on a bracket 25 secured to the filter tank H. This slot, as shown in Figure 3, permits the rear bearing to be moved to adjust the contact of the rear end of the discharger with the filter disk A.

Extending across the front of the machine and substantially in the plane of the discharger shafts, is a shaft 26 supported in bearings on the machine frame, from which the dischargers are driven, as shown in Figures 2 and 6. Bevel gears 27, one for each discharger, are secured to the shaft 26, and mesh with bevel pinions 28 fixed to stub shafts 29 which are mounted substantially in alignment with the respective discharger shaft 2, as shown in Figure 6. I have provided a spherical housing 30 for each set of gears 27, 28, and combine with each casing the bearing 31 of the respective stub shaft, and a bearing 32 for the shaft 26. The construction and arrangement of these casings 30 is clearly shown in Figures 2 and 6. These casings are readily mounted on the machine frame, protect the gears, and maintain perfect meshing.

Each stud shaft 29 is connected to its respective discharger shaft 2 by a flexible drive in order to permit the discharger shaft to move laterally in following a misaligned or warped filter disk. While there are many drives which are suitable for this purpose, I have illustrated the stud shaft 29 and discharger shaft 2 as connected by a double universal joint 33. The usual bearing play is sufficient to take care of the change in shaft length due to all ordinary displacements but, if desired, a slip joint may be employed at any appropriate point.

To drive the shaft 26, it is provided at its end adjacent the drive shaft F with a bevel gear similar to the gears 27. Meshing with this bevel gear is a bevel pinion secured to a rearwardly extending stud shaft 36. A casing 37, similar to the casings 30 for the discharger driving gears is provided for these gears and, as in the case of the former, this casing 37 is constructed to serve as a bearing for the shaft 26 and the stud shaft 36, as shown in Figures 1 and 2. The stud shaft 36 is driven from the motor driven shaft F by any suitable drive, as through sprockets 38 and chain 39, as shown in Figure 1.

It is apparent that in order to rotate the dischargers on each side of a filter disk A, reversely to the direction of rotation of said disk, the dischargers must be rotated reversely to each other. This I accomplish by facing their respective driving bevel gears 27 on the shaft 26 in opposite directions. The reverse rotation of the dischargers to the filter disks effectually draws any clogging matter out of the filter screen.

In Figures 7, 8 and 9, I have shown the adaptation of my invention to a drum type filter, the important parts of which are the perforated drum M adapted to rotate through a tank N substantially encasing the lower half of the drum M resting on suitable supports O and containing the pulp solution or other material being separated.

The rotating drum, supported on suitable bearings, is rotated by the worm-wheel and worm driven by the shaft P and the pulleys Q, all of which is of any standard or preferred construction.

From the shaft P is a power take off 50 driving a rotating discharger 51 which may be adjustable to or from the drum extending substantially the length of the drum M, the discharger being either chain or belt driven and comprising parts similar to those shown in detail in Figure 3.

In operation, as the drum M is rotated through the tank N, a filter cake R adheres to the surface and when the surface of the drum reaches the revolving discharger 51, which is mounted sufficiently close as to cause a wiping and gentle striking action, the filter cake R is stripped therefrom.

In compliance with the present statutes, I have illustrated and described two preferred forms of embodiments of my invention, but it is to be understood that various other modifications and changes could be made therefrom, without departing from the spirit of the invention or the scope of the appended claims.

What I claim is:

1. A device for stripping a filter cake from a filter screen comprising a rotating longitudinally grooved member, U shaped wiping members secured in said grooves with the legs of the U extending outward from the body member.

2. A device for stripping a filter cake from a filter screen comprising a rotating longitudinally grooved body member, and U-shaped wiping members detachably secured in said grooves.

3. A device for stripping a filter cake from a filter screen comprising a rotating longitudinally grooved discharging member, U-shaped wiping members detachably secured in said grooves, and locking members, one for each U-shaped wiping member, engaging the inner portion thereof and detachably secured to the body portion.

4. In a filtering device of the class described, a filter cake discharging device comprising a rotating discharging member having substantially radially extending flexible vanes, said vanes being non-absorbent and detachable and tubular locking means to lock said vanes to said discharging member to prevent localization of stress at the joint of said vanes and said discharging member.

5. In a continuous filter having a filter disk, a rotating filter cake discharging device on each side of said filter disk and extending substantially radially of said disk, means for maintaining the outer ends of said discharging devices in adjustable spaced relation to each other and in floating relation with the filter disk.

6. A rotating filter cake discharging device having at one end a floating support comprising a member secured to the discharger bearing at one end and pivoted to a fixed support at the other.

7. A rotating filter cake discharging device having at one end a floating support comprising an arm secured at its upper end to the discharger bearing and at its lower end pivoted to a fixed support.

8. The combination of a filter disk and a rotating filter cake discharging device having a shaft, a yielding bearing mounting therefor comprising a stud attached to the bearing and passing loosely through an aperture in a supporting bracket, a nut on the end of the stud, a spring between the bearing and the bracket, and a spring between the bracket and the nut, both springs being under slight compression.

9. The combination of a filter disk, a pair of rotating filter cake discharging devices one mounted on each side of said disk and extending from near the center of the disk outwardly, floating supports for the outer ends of said discharging devices, and an adjustable spacing rod connecting said supports and maintaining the outer ends of the discharging devices in adjustable spaced relation.

10. The combination of a rotating filter cake discharging device having a shaft, a driven shaft substantially in alignment with the discharging device shaft, and a flexible connection between said shafts.

11. In a filter of the class described, a rotating discharging device, a driven shaft in substantial alignment with the discharging device, and a double universal joint connecting the driven shaft with the discharging device.

12. In a continuous filter, a filter disk, a rotating discharging device extending from near the center of said disk outward, a floating support for the outer end of said discharging device, a driven shaft normally substantially in alignment with said discharging device, and a yielding connection between the driven shaft and the floating end of the discharging device.

13. In a continuous filter, a revolving filter screen, and a rotating filter cake removing device cooperating therewith detachable, non-absorbent wiping vanes thereon and a yielding bearing pivoted to a fixed support at one end, to maintain said discharger at a uniform tension against said filter cake.

In testimony whereof I have affixed my signature to this specification.

JOSEPH V. ZENTHOEFER.